United States Patent [19]

Hinrichs

[11] Patent Number: 5,782,401
[45] Date of Patent: Jul. 21, 1998

[54] AUTOMATED SYSTEM AND METHOD FOR WELDING A FIRST METAL PART TO A SECOND METAL PART

[75] Inventor: John F. Hinrichs, Menomonee Falls, Wis.

[73] Assignee: R. J. Tower Corporation, Grand Rapids, Mich.

[21] Appl. No.: 704,821

[22] Filed: Aug. 28, 1996

[51] Int. Cl.[6] .................. B23K 9/02; B23K 9/127
[52] U.S. Cl. .................. 228/102; 228/9; 219/124.34
[58] Field of Search .................. 228/102, 9; 219/124.34; 901/42

[56] References Cited

U.S. PATENT DOCUMENTS

| 3,443,732 | 5/1969 | Wall, Jr. et al. | 219/124.34 |
| 4,158,161 | 6/1979 | Suzuki | 228/9 |
| 4,258,425 | 3/1981 | Ramsey | 364/513 |
| 4,392,604 | 7/1983 | Sears | 228/102 |

FOREIGN PATENT DOCUMENTS

| 57-202977 | 12/1982 | Japan | 219/124.34 |
| 3-155470 | 7/1991 | Japan | 219/124.34 |
| 6-238441 | 8/1994 | Japan | 219/124.34 |

*Primary Examiner*—P. Austin Bradley
*Assistant Examiner*—Jeffrey T. Knapp
*Attorney, Agent, or Firm*—Craig J. Lervick

[57] ABSTRACT

The invention provides an automated system for welding a first metal part to a second metal part. The system includes a trainable articulated arm, and a moving mechanism for moving the arm. The moving mechanism comprises servos connected to the arm for moving the arm, and a robot controller connected to the mechanized means for controlling the movement of the articulated arm. The system further includes a welding torch, and a probe with physical dimensions comparable to the torch. The probe includes a seam tracking mechanism for tracking the location of a weld seam in response to movement of the probe along the seam, and a connector for transmitting probe movement to the controller. The system further includes a holder mounted on the articulated arm for interchangeable receiving the torch and the probe so that the torch and the probe assume essentially the same position relative to the arm. The invention also provides a method of welding a first metal part to a second metal part using the above system.

6 Claims, 3 Drawing Sheets

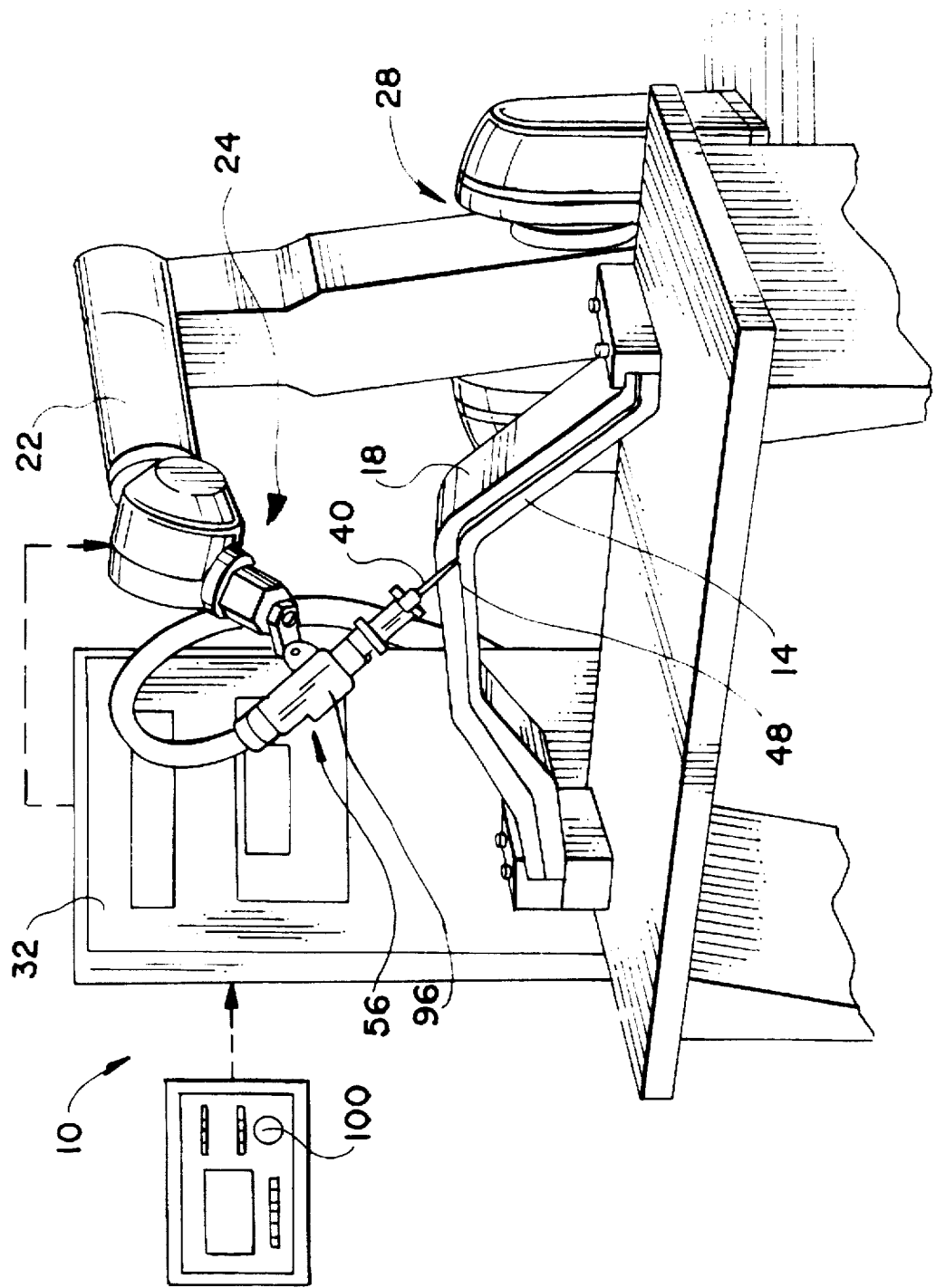

AUTOMATED SYSTEM AND METHOD FOR WELDING A FIRST METAL PART TO A SECOND METAL PART

BACKGROUND OF THE INVENTION

The invention relates to an automated system using a welding torch for welding a first metal part to a second metal part.

There has been much interest in developing various types of tracking systems to allow robots to compensate for process variation. Many tracking systems have been developed for industrial application, but they often have been prohibitively expensive, have significantly increased the cycle time of the process, or have been unreliable in a production environment. Until recently, the closed control architecture and lack of dynamic stiffness of industrial robots has made the development of inexpensive, high performance, tracking systems impractical. However, recent developments in modern industrial robots, including open control architectures and improved dynamic properties, have created new opportunities in this area.

One of the earliest tactile seam tracking systems was an experimental Five-Axis Seam Tracking System (FAST) developed in 1965 jointly by A. O. Smith Corporation and by the University of Wisconsin-Madison. The system welded three-dimensional seams, was completely analog, and operated in real-time by tracking during gas-metal arc welding. This system employed a two-dimensional tactile probe, which had compliance and deflection outputs in two orthogonal directions. The tactile probe was placed 6.35 millimeters (0.25 inches) ahead of the arc and the system was capable of maintaining a position error of ±0.38 millimeters (±0.015 inches) on a 50 millimeter (2.0 inch) radius circle at a tracking/welding speed of 85 millimeters per second (200 inches per minute). A. O. Smith Corporation placed a version of the FAST system in production for welding rear side bar box sections of the Chevrolet "B" frame. The FAST system was subsequently upgraded to make use of digital control technology and operated in a two-pass (record-playback) fashion. The seam was first recorded and then the recorded seam was played back to weld the part. This feature alleviated the wear problems associated with tracking in real-time. The system was tested in production in early 1979 and was capable of recording at 25 millimeters per second (60 inches per minute) with less than ±0.25 millimeter (0.01 inches) on a 50 millimeter (2 inch) radius circle.

With the introduction of the low cost, mass-produced industrial robot in the late 1970's, the competitiveness of the FAST system, which required a special purpose robot with high dynamic stiffness and high servo performance, was greatly diminished. Unfortunately, the open architecture, computational power, and programmability necessary to add a low cost tactile seam tracking system to these industrial robots was not available. The lack of stiffness of these early industrial robots was also an issue, precluding satisfactory tracking performance.

Since the early 1980's most of the development in seam tracking systems for industrial welding robots has been in the vision area. The harsh production environment with inconsistent vision conditions (e.g. smoke and oil in the arc welding process) caused the early vision systems particular problems, but these problems have been significantly reduced in the most recent systems. Unfortunately, these systems tend to be very expensive, sometimes as expensive as the robot, because their optical systems and intensive computation often require expensive hardware. A tactile seam tracking system, by comparison, requires relatively little computation and a relatively simple probe. Inexpensive tactile seam tracking systems could therefore be constructed if a robust, easy-to-manufacture, tactile probe could be directly interfaced to a robot with an open architecture capable of supporting tracking computation based on tactile probe feedback. Industrial robots have not had such an open architecture, but modern industrial robots now allow inexpensive computation and interfacing. Furthermore, the dynamic stiffness and servo performance of these robots has significantly improved, creating the opportunity to achieve satisfactory tracking performance.

SUMMARY OF THE INVENTION

The invention provides an automated system for welding a first metal part to a second metal part, the system comprising: a trainable articulated arm, and moving means for moving the arm. The moving means comprises mechanized means connected to the arm for moving the arm, and programmable means connected to the mechanized means for controlling the movement of the articulated arm. The system further includes a welding torch, and a probe with physical dimensions comparable to the torch. The probe includes seam tracking means for tracking the location of a weld seam in response to movement of the probe along the seam, and connector means for transmitting probe movement to the programmable means. The system further includes holder means mounted on the articulated arm for interchangeable receiving the torch and the probe so that the torch and the probe assume essentially the same position relative to the arm.

In one embodiment of the invention, the probe is a tactile probe and the seam tracking means comprises: a probe body, a probe stylus, and stylus mounting means movably connecting the probe stylus to the probe body so that the stylus is compliant in at least two orthogonal directions.

In one embodiment of the invention, the articulated arm moves the tactile probe along the seam in a noncompliant direction.

The invention also provides a method of welding a first metal part to a second metal part using the above system and comprising the steps of: mounting the probe on the articulated arm, moving the articulated arm and probe along the seam to be welded in order to train the arm, replacing the probe with the torch so that the torch assumes essentially the same position as the probe, and using the trained articulated arm to move the torch along the seam to weld the seam.

One of the principal features of this invention is the provision of an inexpensive tactile seam tracking system feasible on a modern industrial robot with an open architecture. A low-cost tactile probe is used, and the existing robot control is used to perform all calculations, showing that the path of the robot could be controlled in real-time without the addition of expensive sensing, computational, and interfacing equipment to the robot.

Another of the principal features of this invention is the provision of such an inexpensive tactile seam tracking system where a probe is used on a robot, the probe assuming essentially the same position as the welding torch, so that the probe can track a weld seam in the same fashion as the welding torch. This permits the probe to maneuver in the same way as the torch around brackets and fixtures for holding the parts to be welded in place, as well as the parts themselves. This greatly simplifies the process of training the robot and reduces the cost of the tracking system.

Other features and advantages of the invention will become apparent to those skilled in the art upon review of the following detailed description, claims and drawings.

BRIEF DESCRIPTION OF THE DRAWINGS

FIG. 1 is a perspective view of an automated system for using a welding torch for welding a first metal part to a second metal part. In this figure a tactile probe is shown while tracking a seam to be welded.

Figure 3:
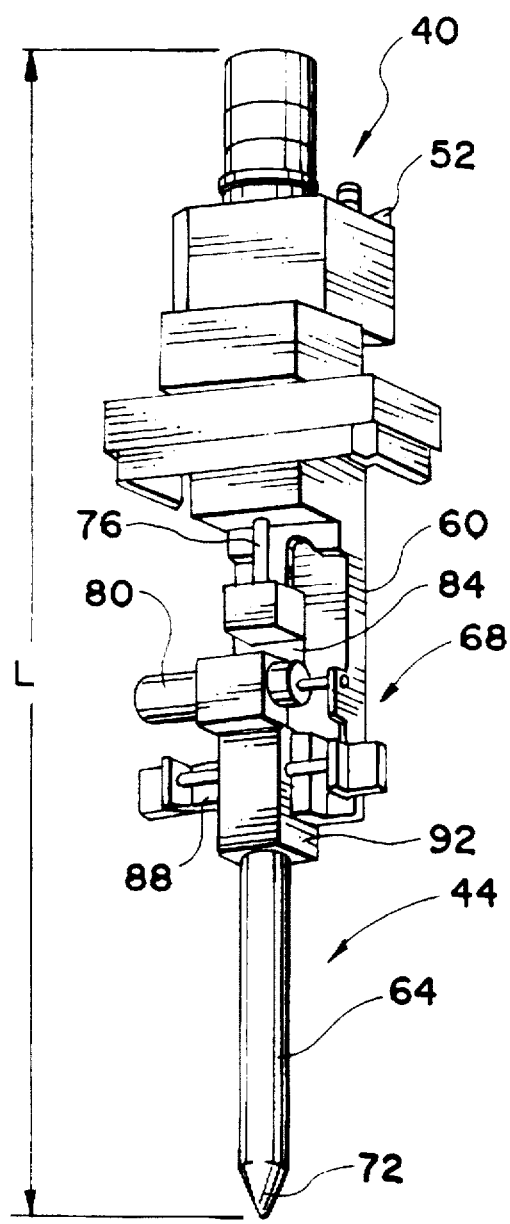
FIG. 3 is a perspective view of a tactile probe for tracking a welding seam.
Figure 2:
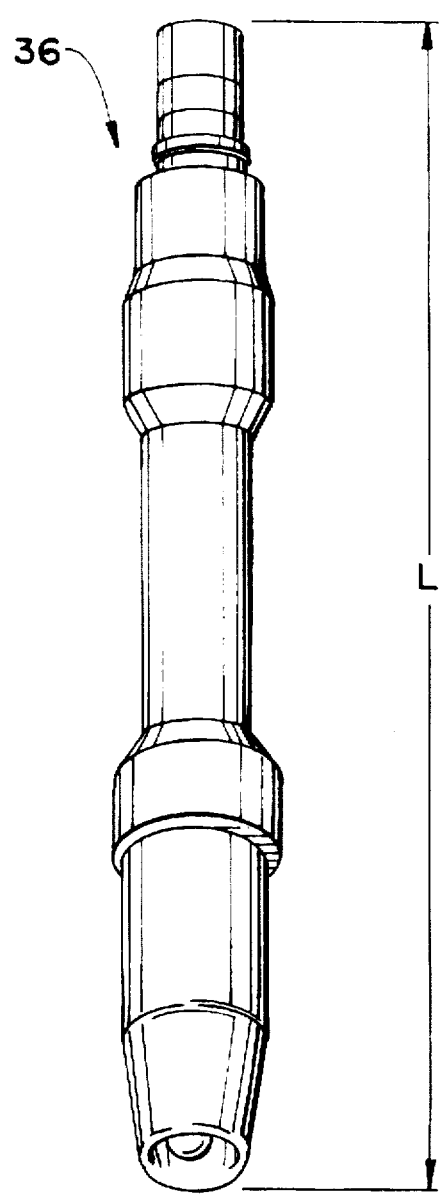
FIG. 2 is a perspective view of a welding torch for welding a first metal part to a second metal part.
Figure 4:
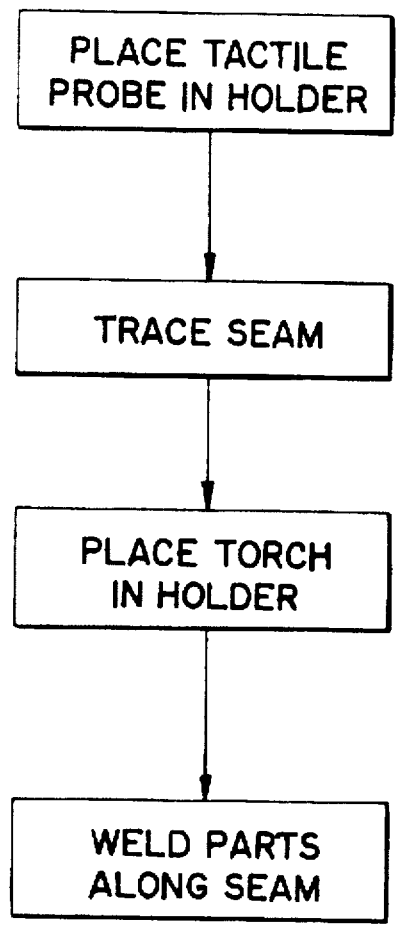
FIG. 4 is a flow diagram of a method of welding a first metal part to a second metal part.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Referring now to the drawings, FIG. 1 illustrates an automated system for welding a first metal part 14 to a second metal part 18, the system 10 comprising: a trainable articulated arm or robot 22, and moving means 24 for moving the arm 22. The moving means 24 comprises mechanized means 28 or servos (not shown) connected to the arm 22 for moving the arm 22, and programmable means or controller 32 connected to the mechanized means 28 for controlling the movement of the articulated arm 22. The system 10 further includes a welding torch or gun 36, and a probe 40 with physical dimensions comparable to the torch 36. The probe 40 includes seam tracking means 44 for tracking the location of a weld seam 48 in response to movement of the probe 40 along the seam 48, and connector means 52 for transmitting probe movement to the programmable means 32. The system further includes holder means 56 mounted on the articulated arm 22 for interchangeable receiving the torch 36 and the probe 40 so that the torch 36 and the probe 40 assume essentially the same position relative to the arm 22.

More particularly, the probe 40 is a tactile probe and the seam tracking means comprises: a probe body 60, a probe stylus 64, and stylus mounting means 68 movably connecting the probe stylus 64 to the probe body 60 so that the stylus 64 is compliant in at least two orthogonal directions. The articulated arm 22 moves the tactile probe 40 along the seam 48 in a noncompliant direction.

The probe 40 is used to sense, by physical contact, the position of a seam 48 with respect to the last joint of the robot 22, the end of the robot wrist. Linear bearings (not shown) in the probe 40 resolve the movement of the tip 72 of the stylus 64 into two components, a lateral and normal direction. The normal direction (Z axis) of probe movement is parallel to the probe body 60 and stylus axis and the lateral direction (X axis) of probe movement is perpendicular to the normal direction. Linear variable differential transformers (LVDT) convert the deflection of the two axes into analog voltage signals that were proportional to the deflection and amplified. The amplified signals are connected to the analog inputs on the robot. FIG. 3 shows the probe with its cover removed, illustrating the stylus mount means 68 including a "Z" LVDT 76, an "X" LVDT 80, a "Z" rail 84, an "X" rail 88, and an "X" car 92.

Displacing the tactile stylus tip 722 along a path parallel to the probe body 60 results in movement of the Z axis rail 84 with respect to the probe body 60. Moving the stylus tip 72 along a path perpendicular to the probe body 60 results in movement of the X axis car 92 with respect With the X axis rail 88. The X axis and Z axis linear bearing travels are limited to + or −6.35 mm (+ or −0.25 inches) using mechanical stops (not shown).

The stylus rests in the center of the X axis and the Z axis rests in the fully extended position when the stylus is not in contact with the part. A compression spring (not shown) returns the Z axis to its extended position. To return the X axis to its center, a compression spring (not shown) is fitted over plungers (not shown) that limited extension of the spring. These are mounted at the ends of the X axis rail 88.

The two LVDTs sense the positions of the X axis and Z axis cars relative to an X axis zero position and Z axis zero position, respectively. The LVDTs are mounted on the probe 40 such that they sense the positions of the linear bearing cars relative to their rails. An RDP LVDT, Type D5/200, with a threaded body and solder pin type connectors is used to sense X axis movement. A similar LVDT with threaded mount and attached cord is used to sense Z axis movement.

To minimize robot down time, the probe is designed to be inserted into a modified Binzel ROBO welding gun WH 505. The probe 40 is designed to interchange with, and have the same overall length L as, a Binzel torch neck (Binzel Robo WH 505 180d std) of the torch 36. The modifications to the Binzel ROBO welding gun or holder 56 included, machining a pocket in the plastic gun housing to accept a ten-pin electrical connector (not shown) and cutting a hole (not shown) on the bottom back of the gun to feed the wires from the plug out of the gun. The connector did not protrude from, or interfere with, the normal operation of the weld gun. The holder connector mates with the electrical connector 52 on the probe 40.

In order to prevent the stylus 64 from sagging, the mass of the stylus 64 is reduced by hollowing out the stylus. the Z axis spring return force must be at least three times the X axis spring return force throughout the range of motion of the probe 40 in order for the stylus tip 72 to track the seam 48.

The robot 22 is an ABB Flexible Automation IRB 2400/S4 six-axis robot—Version M94A software. The robot 222 has a teach pendant 100 to allow the operator to manually move the robot 22. The teach pendant 100 also allows the operator to move the robot 22 through the use of programs written in the high level language. The teach pendant 100 also presented the user with the opportunity to write and execute programs.

A tactile seam tracking algorithm is used in a control program of the industrial robot 22 to continually update the position and orientation of the probe 40, so that it travels in and along the seam 48. The orientation is calculated such that the probe 40 is always maintained in the same orientation (perpendicular) with respect to the seam 48. The algorithm employs a seam coordinate system described by unit vectors in a world coordinate system. The seam coordinate system's Y axis is tangential to the seam and represents the direction of travel. The X axis and Z axis are then defined as the lateral direction and normal direction, respectively. The direction of the Z axis is an equal angle from both surfaces of the seam 48, thus for a 90° lap joint, the Z axis is 45° degrees from both surfaces. The X axis of the seam coordinate system is then orthogonal to the Y axis and Z axis.

The objective of the tracking algorithm is to maintain the alignment of the probe coordinate system with the seam coordinate system. The compliant directions of the probe 40, therefore, are controlled to lie in the X and Z directions of the seam 48, and the rigid direction of the probe 40 is controlled to lie in the Y direction of the seam 48.

The purpose of the seam tracking algorithm is to command the motion of the robot 22, as a function of the probe deflections, so that the probe 40 remains in the seam 48 and travels along the seam 48. In this tracking algorithm, unit vectors describing the seam coordinate system are first rotated based upon the magnitude of the probe deflections. When there is a change in the direction of the seam 48, the probe stylus 64 will deflect and the rotation of the seam coordinate system is calculated to match the current direction of the seam 48. The orientation command for the robot 22 is then calculated from the unit vectors describing the seam coordinate system. The position command for the robot 22 is also calculated from the unit vectors. An incremental displacement is calculated that describes the direction of the seam at the current instant of time. This incremental displacement then is added to the previous position command for the robot 22. The algorithm is performed repeatedly, at times separated by an interval henceforth referred to as the sample period. Thus, the algorithm represents a closed-loop control system in which, once per sample period, the probe displacements are acquired and new position and orientation commands are calculated for the robot 22 that tend to reduce the probe deflections and to drive the probe 40 along the seam 48.

The unit vectors that represent the axes of the seam coordinate system are updated each sample period to keep them approximately aligned with the X, Y, and Z axes of the actual seam, by adding, control vectors to them that are a function of the deflections of the probe. The update of all three vectors from the probe deflections is accomplished by two separate rotations.

$$\vec{Y}_n' = \frac{(\vec{Y}_{n-1} + \vec{C}_{x_L})}{|\vec{Y}_{n-1} + \vec{C}_{x_L}|} \quad (1)$$

$$\vec{X}_n' = \frac{(\vec{X}_{n-1} - \vec{C}_{y_L})}{|\vec{X}_{n-1} + \vec{C}_{y_L}|} \quad (2)$$

$$Z_n' = Z_{n-1} \quad (3)$$

where $$\vec{C}_{y_L} = \left( K_d(\delta_{L_{n-1}} - \delta_{L_{n-2}}) + K_p \delta_{L_{n-1}} + K_i \sum_{j=1}^{n-1} \delta_{L_j} \right) \vec{Y}_{n-1} \quad (4)$$

$$\vec{C}_{x_L} = \left( K_d(\delta_{L_{n-1}} - \delta_{L_{n-2}}) + K_p \delta_{L_{n-1}} + K_i \sum_{j=1}^{n-1} \delta_{L_j} \right) \vec{X}_{n-1} \quad (5)$$

where $\vec{Y}_{n-1}$=tangential vector (Y axis of previous seam coordinate system), $\vec{X}_{n-1}$=lateral vector (X axis of previous seam coordinate system), $\vec{Z}_{n-1}$=normal vector (Z axis of previous seam coordinate system), $\vec{Y}_n$=tangential vector (Y axis of partially updated seam coordinate system), $\vec{X}_n$=lateral vector (X axis of partially updated seam coordinate system), $\vec{Z}_n$=normal vector (Z axis of partially updated seam coordinate system), $\vec{C}_{x_L}$=control vector (in direction of lateral vector) added to tangential vector, $\vec{C}_{y_L}$=control vector (in direction of tangential vector) added to lateral vector, $\delta_{L_{n-1}}$=lateral probe deflection, $K_i$=integral gain, $K_p$=proportional gain, and $K_d$=derivative gain.

Because the probe deflections are controlled variables, the magnitude of the rotation is a function of derivative, proportional, and integral gains. A rotation that is only proportional to the deflections can result in oscillatory tracking motion. To damp the tracking motion, derivative control may be necessary, depending on the gain. If zero tracking error (tracking with zero deflections) on a circle is desired, then integral control is also necessary.

This rotation can be expressed as, $$\vec{Y}_n = \frac{(\vec{Y}_n' + \vec{C}_{z_N})}{|\vec{Y}_n' + \vec{C}_{z_N}|} \quad (6)$$

$$\vec{Z}_n = \frac{(\vec{Z}_n' + \vec{C}_{y_N})}{|\vec{Z}_n' + \vec{C}_{y_N}|} \quad (7)$$

$$\vec{X}_n = \vec{X}_n' \quad (8)$$

$$\vec{C}_{y_N} = \left( K_d(\delta_{N_{n-1}} - \delta_{N_{n-2}}) + K_p \delta_{N_{n-1}} + K_i \sum_{j=1}^{n-1} \delta_{N_j} \right) \vec{Y}_{n-1} \quad (9)$$

$$\vec{C}_{z_N} = \left( K_d(\delta_{N_{n-1}} - \delta_{N_{n-2}}) + K_p \delta_{N_{n-1}} + K_i \sum_{j=1}^{n-1} \delta_{N_j} \right) \vec{Z}_{n-1} \quad (10)$$

where $\vec{X}_n$=lateral vector (X axis of updated seam coordinate system), $\vec{Y}_n$=tangential vector (Y axis of updated seam coordinate system), $\vec{Z}_n$=normal vector (Z axis of updated seam coordinate system), $\vec{C}_{y_N}$=control vector (in direction of tangential vector) added to partially updated normal vector, $\vec{C}_{z_N}$=control vector (in direction of normal vector) added to partially updated tangential vector, and $\delta_{N_{n-1}}$=normal probe deflection.

Once the updated seam coordinate system has been determined, it can be used to command the robot 22 to orient the probe axes so they are coincident with the updated coordinate system and to translate the probe 40 in the tangential direction using the tangential vector.

$$P_n = P_{n-1} + VT\vec{Y}_n \quad (11)$$

where $P_n$=next commanded position, $P_{n-1}$=previous commanded position,

V=commanded robot linear velocity, and

T=sample period.

To command the robot 22 to orient the probe 40 such that its lateral and normal deflections are coincident with the X and Z axes of the seam coordinate system and its rigid axis lies in the direction of travel, a tool coordinate system is defined that has axes that are fixed with respect to the tool (the probe in this case). In general, the orientation of the tool coordinate system with respect to the world coordinate system (desired orientation) can be broken down into two known transformations.

$$_t{}^WR = {}_t{}^SR_s{}^WR \tag{12}$$

where $_t{}^WR$=tool coordinate system with respect to the world coordinate system required to maintain the probe oriented with respect to the seam, $_t{}^SR$=describes the fixed rotation of the tool coordinate system with respect to the seam coordinate system transformation, and $_s{}^WR$=describes the current rotation of the seam coordinate system with respect to the world coordinate system transformation.

The components of $_s{}^WR$ are determined from the lateral, tangential, and normal vectors, that lie coincident with the axes of the current seam coordinate system. $_t{}^SR$ can be determined prior to tracking by manually orienting the probe such that the probe coordinate system is aligned with the seam coordinate system. The probe 40 is placed at the starting point of the seam 48 and the position of the probe 40 is recorded. The probe 40 can then be placed at a nearby point along the seam and that position recorded. These two points define the tangential vector, $\vec{Y}$. A third point, which is nearly in a normal direction to the starting point, can then be used to define the plane in which the normal vector lies.

A multiple phase (record-playback) process tests the tracking system. If the part has not been previously tracked, the system is instructed to first track the part to record the seam that is to be welded. Following tracking, the system corrects the path based on stored probe deflections and then optimized the path into a small number of linear segments. The optimized path is then played back to confirm its accuracy. Next, the operator is allowed to teach the robot welding parameters, such as welding speed, wire feed speed, voltage, and torch angles. Finally, the system welds the part. In the event the user wanted to re-record the seam, the previously recorded seam is updated by retracking the part.

Of most interest is the tracking performance. The robot 2222 is able to track a 50 millimeter (2.0 inch) radius circle at 6 millimeters per second (15 inches per minute) with less than a ±2.5 millimeter (±0.1 inch) tracking error. The major contributor to this tracking error, confirmed by using a discrete dynamic model of the system, is found to be the 5 Hertz sample rate (0.2 second sample period) of the controller, which is limited due to a delay in the analog-to-digital inputs of the robot 22. The tracking speed on the first tracking is 6 millimeters per second (15 inches per minute). During the first tracking, the system is "blind," meaning that the system had no information about the path that is to be tracked other than an approximate start point and approximate end point. However, on retracking, the tracking speed is increased dramatically to a desired 25 millimeters per second (60 inches per minute) by using the previously stored path in feed forward control.

The final resulting one-sigma repeatability of the system is estimated to be ±0.04 millimeters (±0.0015 inches) and the accuracy is ±0.25 millimeters (±0.01 inches). This accuracy is sufficient for the welding process to which the system is applied (one half of the welding wire diameter).

The tracking system is capable of tracking blindly at 6 millimeters per second (15 inches per minute), and retracking at 25 millimeters per second (60 inches per minute) with the use of feed forward control. This performance is acceptable for production seam welding because the first tracking need only be performed at the beginning of production. Retracking then can be performed to adapt to drift in seam geometry due to factors such as die wear, die replacement, or change in material thickness.

Various features of the invention are set forth in the following claims.

I claim:

1. An automated system for welding a first metal part to a second metal part, the system comprising:

an articulated arm, moving means for moving said arm, said moving means comprising:

mechanized means connected to said arm for moving said arm, and programmable means connected to said mechanized means for controlling the movement of said articulated arm, a welding torch, a probe with physical dimensions comparable to said torch, said probe including seam tracking means for tracking the location of a weld seam in response to movement of the probe along the seam, said probe including connector means for transmitting probe movement to said programmable means, and holder means mounted on said articulated arm for interchangeable receiving said torch and said probe so that said torch and said probe assume essentially the same position relative to said arm.

2. An automated system for welding a first metal part to a second metal part in accordance with claim 1 wherein said probe is a tactile probe and wherein said seam tracking means comprises:

a probe body, a probe stylus, and stylus mounting means movably connecting said probe stylus to said probe body so that said stylus is compliant in at least two orthogonal directions.

3. An automated system for welding a first metal part to a second metal part in accordance with claim 2 wherein said articulated arm moves the tactile probe along the seam in a noncompliant direction.

4. A method of welding a first metal part to a second metal part using a trainable articulated arm, a welding torch, a probe with physical dimensions comparable to the torch, the probe including seam tracking means for tracking the location of a weld seam in response to movement of the probe along the seam, and holder means mounted on the articulated arm for interchangeable receiving the torch and the probe so that the torch and the probe assume essentially the same position relative to the arm, the method comprising the steps of:

mounting the probe on the articulated arm, moving the articulated arm and probe along the seam to be welded in order to train the arm, replacing the probe with the torch so that the torch assumes essentially the same position as the probe, and using the trained articulated arm to move the torch along the seam to weld the seam.

5. A method of welding a first metal part to a second metal part in accordance with claim 4 wherein the probe is a tactile probe and said seam tracking means comprises:

a probe body, a probe stylus, and stylus mounting means movably connecting the probe stylus to the probe body so that the stylus is compliant in at least two orthogonal directions.

6. A method of welding a first metal part to a second metal part in accordance with claim 5 wherein the articulated arm moves the tactile probe along the seam in a noncompliant direction.

* * * * *